July 23, 1935.  E. G. CARROLL  2,009,105
HYDRAULIC BRAKE
Filed March 31, 1932
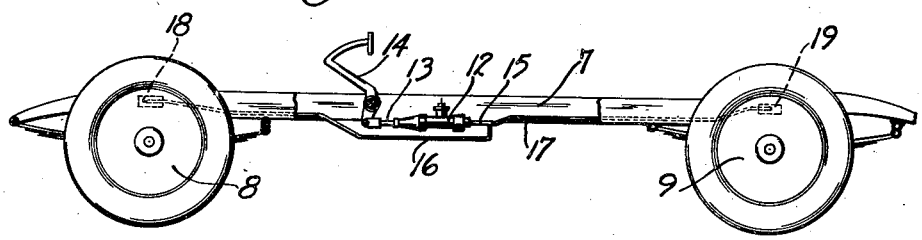
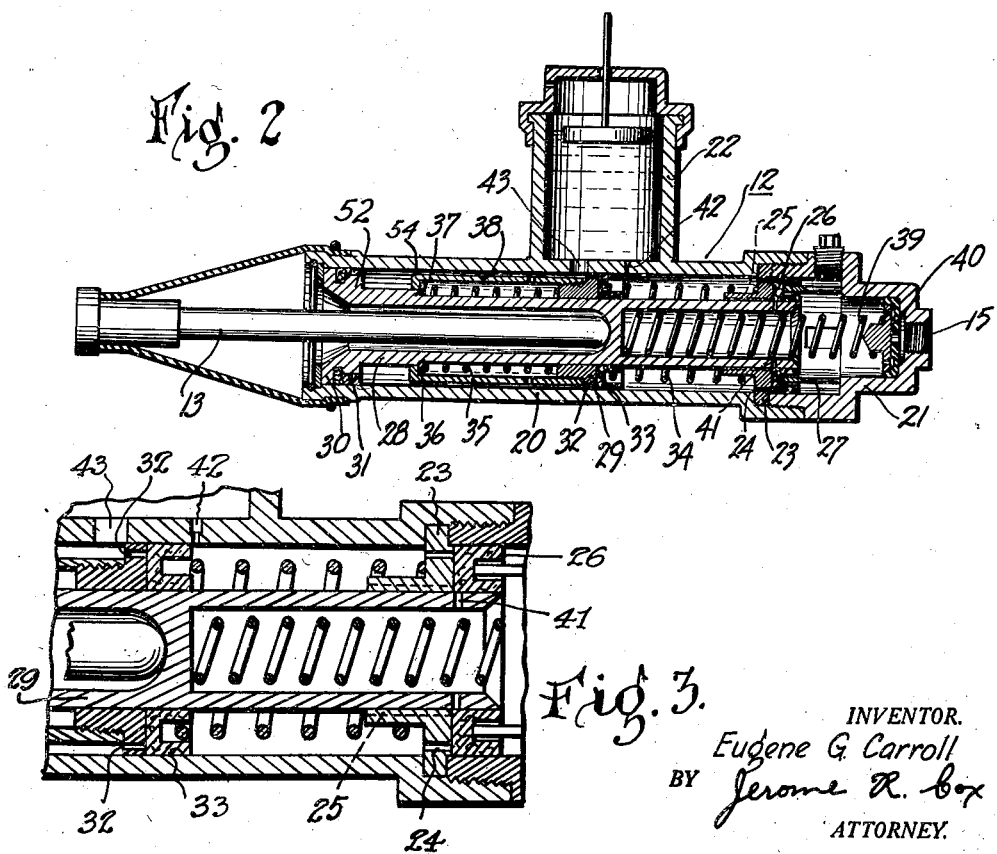
INVENTOR.
Eugene G. Carroll
BY Jerome R. Cox
ATTORNEY.

Patented July 23, 1935

2,009,105

UNITED STATES PATENT OFFICE 2,009,105

HYDRAULIC BRAKE

Eugene G. Carroll, South Bend, Ind., assignor to Bendix Aviation Corporation, South Bend, Ind., a corporation of Delaware Application March 31, 1932, Serial No. 602,329

11 Claims. (Cl. 60—54.6)

This invention relates to hydraulic braking systems and more particularly to a master cylinder adapted to produce relatively high braking pressures through the expenditure of relatively low pedal pressures.

In the operation of an ordinary master cylinder, the pressure developed in the fluid at any instant of time is directly proportionate to the pressure exerted upon the pedal. By reason of this arrangement, the initial pedal pressure is relatively low while the initial pressure developed in the system is also relatively low. However, when pressure developed by the master cylinder (i. e. line-pressure) becomes relatively high, the pedal pressure also becomes relatively high.

In systems of the "two-phase" type, the ratio between the pressure developed in the system and the pressure exerted upon the pedal varies during the operation of the device so that during the initial phase of the operation the ratio is relatively low but during later phases of operation, the ratio is relatively high. Therefore, in such two-phase systems, initial pedal pressures become relatively high, but this is compensated for because the operator is able to obtain relatively high final pressures through the expenditure of relatively low final pedal pressures.

One of the objects of my invention is to provide an operative and practical system of "two-phase" hydraulic braking.

A further object of the invention is to simplify and minimize the cost of the construction of such a device.

A further object of the invention is to provide efficient means for retaining the fluid displaced during the initial operation of the system and for exerting upon this fluid increased pressure.

A feature of the invention is the provision of a pair of separately movable concentric pistons in a cylinder, one of the pistons being centrally located and the other being annular in shape and surrounding the first named, and one of the pistons having a larger effective area than the other, the two pistons acting together during the initial phase of the operation and the smaller area piston acting alone during the final phase of the operation.

A further feature of the invention resides in the positioning of a pressure relief chamber within the master cylinder itself and thus eliminating additional construction.

Further features of the invention relate to an improved cup valve construction, an arrangement of the pistons so that during the high pressure phase of operation pressure on opposite sides of the cup valve is equalized, and an arrangement of the controlling spring in a casing within the body of the cylinder and to various other details of construction.

Further objects and features of the invention will be apparent after a reading of the subjoined specification and claims and after a consideration of the accompanying drawing in which:

Figure 1 is a diagrammatic view in elevation of an automobile equipped with a hydraulic braking system constructed according to my invention;

Figure 2 is a view in vertical section of the master cylinder of Figure 1 shown on a greatly enlarged scale; and Figure 3 is a view in section of a portion of the master cylinder on a still larger scale.

Referring in detail to the drawing, there is shown in Figure 1 a chassis of an automobile having a frame 7 mounted on road wheels such as 8 and 9 and having secured thereto a master cylinder 12 operated through a piston rod 13 by a pedal 14. Connected to the forward end of the master cylinder 12 is a conduit 15 having branches such as 16 and 17 leading to wheel cylinders in all of the road wheels illustrated by the wheel cylinders 18 and 19 positioned in the wheels 8 and 9.

The master cylinder 12 is formed of a pair of castings 20 and 21, the former being substantially cylindrical but being formed with a superposed annular flange 22 which provides a reservoir for a reserve supply of fluid. Secured in the cylinder 12 between the castings 20 and 21 is a fixed annular head 23 through which the high pressure piston slides. The head 23 is formed with a plurality of ports such as ports 24 and with a plurality of grooves such as the groove 25 which are provided for purposes later to be described. Said head 23 has associated with the forward side thereof an annular rubber cup packing 26 which faces forward and is held in place by a tubular member 27. It may be seen that fluid may at all times pass forward through the ports 24 and past the cup 26 but that at times the cup 26 is effective to prevent the return thereof.

Means are provided to force fluid from the cylinder to exert braking force. Positioned within the cylinder are a pair of pistons 28 and 29. The piston 28 is formed with a uniform diameter substantially throughout, but at its rear end has a head 30 provided with a packing cup 31.

The piston 29 is larger in area than the piston 28, is annular in shape, and surrounds the piston 28. It is freely floating within the cylinder 12 except for the effect of two springs which bear upon its forward side and upon its rearward side. The metallic portion thereof comprises a collar which is formed with ports such as ports 32 and the piston also includes an annular rubber packing cup 33 which contacts with the forward side of the collar. Thus fluid may pass freely forward through the ports 32 past the cup 33 but may not pass rearwardly.

Means are provided to cause the piston 29 to move at times as a unit with the piston 28. As stated above the piston 29 is freely floating except for the effect of two springs. One of these springs designated 34 is relatively light and has substantially no effect on the movement of the piston. It bears at its forward end upon the head 23 and at its rearward end on the cup 33 and thus cooperates with the liquid when under pressure to hold the cup 33, in position. The second spring 35 is relatively strong and bears at its forward end against the piston 29 and at its rearward end upon a washer or collar 36 which bears against a shoulder 37 formed upon the piston 28. Surrounding the spring 35 is a guide member or cage 38 which maintains the spring under a predetermined degree of deflection and also in proper relationship. The guide member 38 prevents buckling of the spring 35 but nevertheless allows compression of the spring as the smaller piston advances to develop the higher braking pressures.

As may be seen clearly in Figure 2, the piston 28 is provided with a shoulder 52 and the forward movement of the piston 28 relative to the annular piston 29 is limited by reason of the fact that the rear end 54 of the guide member 38 is in the path of said shoulder 52. If at any time the shoulder contacts with said guide member 38, the shoulder and the guide member form a solid link for forcing the annular piston 29 to move forward thereafter as a unit with the central piston 28. When the pistons 28 and 29 move forward as a unit a portion of the fluid trapped between the annular piston 29 and the head 23 is forced through the grooves 25 and past the cup 26 to aid in the brake application. In order to provide for normal brake application, the distance between the shoulder 52 and the rear end 54 of the guide member 38 is arranged, so that the additional pressure (which it is normally possible to develop by movement of the piston 28 after the piston 29 is stopped) when added to the pressure developed by the pistons working together during the first part of the stroke, is slightly greater than the pressure required to exert maximum braking effort on the vehicle.

The arrangement disclosed and described serves as a safety device. Even should the spring 35 break, yet the same maximum braking effort would be possible in such an emergency.

The piston rod 13 contacts with the piston 28 for operating the piston 28 and through it and the spring 35 for operating the piston 29. During the initial phase of brake application spring 39 bears at its forward end upon a two-way check valve 40 and at its rear end is seated in a recess in the front end of the piston 28. The spring 39 thus serves the double purpose of aiding in the return of the piston 28 and of maintaining the two-way check valve 40 upon its seat except as it is raised therefrom by pressures of fluid in the conduit 15 ahead of the valve. The check valve 40 is a two-way check valve allowing substantially free passage of liquid forward but limiting the passage of liquid rearward so as to maintain a constant predetermined pressure in the liquid ahead of said valve. The valve 40 is described more particularly and is claimed in my co-pending application Serial No. 602,328.

Means are provided for relieving the portions of the cylinder ahead of the pistons 28 and 29 of the excess of fluid which is developed on each brake application by the filling of the lines by the large area annular piston during the initial phase. These means also serve to relieve said portions of excesses of fluid which may arise from expansion of the liquid due to temperature increases. The piston 28 is provided with ports such as 41 through which liquid may flow from ahead of the piston 28 and thence through the grooves 25. One or more ports such as 42 are provided in the cylinder 12 just ahead of the normal inactive position of the piston 29 and at times allows the passage of excess fluid back to the reservoir 22. A port 43 is also provided in the cylinder 12 connecting with the reservoir 22 and maintains the fluid in the cylinder rearwardly of the piston 29 always substantially under atmospheric pressure.

In the operation of the hydraulic braking system illustrated, pressure on the pedal 14 operates through the piston rod 13 to force the piston 28 forward. The shoulder 37 acts upon washer 36 and thus upon the spring 35 and so forces the piston 29 forward so that the ports 41 and 42 are substantially simultaneously closed and fluid is forced past the valve 40 to the brakes. The fluid trapped ahead of the piston 29 passes through the ports 24 and the grooves 25 and by the cup 26 and together with the fluid trapped ahead of the piston 28 is forced out past the check valve 40. The liquid forced past the valve 40 passes through conduits 15, 16, and 17 to the wheel cylinders 18 and 19 to apply the brakes.

After the lines have been filled with fluid through the operation of the large area of the combined areas of pistons 28 and 29, pressure in the lines builds up rapidly.

When on said forward stroke, pressure in the lines reaches a predetermined value, this pressure prevents further forward movement of the piston 29 as the spring 35 is put under further compression. From then on the piston 28 acts alone on the fluid which is trapped ahead of the fixed head 23 to apply the brakes under relatively high pressure.

It may be noted that in one sense the pressure exerted in compressing the spring is lost, but the loss is more than compensated for by the additional leverage obtained. Assume for the sake of example only that the spring 35 has a weight of 150 lbs.; that the brake return springs exert a pressure on the fluid sufficient to raise the line pressure to 30 lbs.; that the area of the piston 28 is one half of that of the usual master cylinder piston which is substantially equal to the area of the wheel cylinder pistons; that the area of the pston 29 is three times that of the piston 28 and that the mechanical leverage ratio from the pedal to the piston rod 13 is substantially 5:1. Thus a pedal pressure of 100 lbs. in the usual system would theoretically produce a pressure of 500 lbs. upon each of the wheel cylinder pistons. In my system a pedal pressure of 100 lbs. would exert 500 lbs. upon the piston 28. Of this pressure 150 lbs. would be used in compressing the spring 35. The remaining 350 lbs. would create a liquid pressure which theoretically would act on each of the wheel cylinder pistons with a pressure of 700 lbs., (the wheel cylinder pistons having twice the area of the piston 28).

When the pedal 14 is released the pressure of the springs in the brakes acts upon the pistons in the wheel cylinder and forces liquid rearward through the conduits 17, 16, and 15 past the valve 40 to act upon the front end of the piston 28. This forces the piston 28 rearward until the ports 41 reach the rear end of the cup 26 and liquid is then allowed to escape through the ports 41 and the grooves 25. This return of liquid acts upon the piston 29 and forces it rearward to the position shown in the drawing whereupon the excess of liquid may escape through the ports 42 into the reservoir 22.

It is to be understood that the above described embodiments of the invention are for the purpose of illustration only and various changes may be made therein without departing from the spirit and scope of the invention.

I claim:

1. In a hydraulic brake system, a cylinder, a central piston in said cylinder, an annular piston surrounding said central piston, a fixed annular head which contacts with the walls of said cylinder and through which said central piston slides, and a spring bearing at one end upon said annular piston and at the other end upon said central piston, said annular head being provided with a one-way sealing cup which allows liquid to be forced forwardly past it at any time, but during the working stroke prevents rearward passage of liquid whereby the annular piston is effective to displace liquid past the annular head until the pressure of the liquid counterbalances the spring regardless of the positions of the pistons.

2. For use in a hydraulic brake system, a master cylinder, a central piston mounted in said master cylinder, an annular piston mounted in said master cylinder and surrounding said central piston, a fixed annular head which contacts with the walls of said cylinder and through which said central piston slides, and means for displacing said pistons, said annular head being provided with a one-way sealing cup which allows liquid to be forced forwardly past it at any time, but during the working stroke prevents rearward passage of liquid whereby the annular piston is effective to displace liquid past the annular head until the pressure of the liquid counterbalances the spring regardless of the positions of the pistons.

3. For use in a hydraulic brake system, a master cylinder, a central piston, an annular piston having a different effective area from that of said central piston mounted in said master cylinder and surrounding said central piston, a one-way check valve comprising an annular head through which said central piston slides, positioned in front of the annular piston and surrounding the small piston, thus allowing the liquid in front of the annular piston to be expelled to the outlet of the master cylinder and means for displacing both of said pistons.

4. For use in a hydraulic braking system, a master cylinder, a central piston mounted in said master cylinder, an annular piston having a larger effective area than the area of said central piston mounted in said master cylinder and surrounding said central piston, a fixed annular head which contacts with the walls of said cylinder and through which said central piston slides, and means for displacing both of said pistons, and a spring bearing on said pistons, said annular head being provided with a one-way sealing cup which allows liquid to be forced forwardly past it at any time but during the working stroke prevents rearward passage of liquid whereby the annular piston is effective to displace liquid past the annular head until the pressure of the liquid counterbalances the spring regardless of the positions of the pistons.

5. For use in a hydraulic brake system, a master cylinder, a central piston mounted in said master cylinder, an annular piston mounted in said master cylinder and surrounding said central piston, manual means for displacing said central piston, resilient means connecting said central piston with said annular piston, means for forming a solid connection between said pistons effective either when the spring is compressed a certain predetermined distance or if the spring should happen to break.

6. For use in a hydraulic brake system, a master cylinder, a central piston mounted in said master cylinder, a plurality of annular cups through which said central piston slides, one of which provides means for preventing rearward movement of fluid but which allows substantially free forward movement thereof, an annular piston mounted in said master cylinder and surrounding said central piston, and means for displacing said pistons, one of said annular cups being positioned in front of the annular piston and surrounding the small piston, thus allowing liquid in front of the annular piston to be expelled to the outlet of the master cylinder.

7. For use in a hydraulic braking system, a master cylinder, a central piston having a uniform diameter substantially through-out mounted in said master cylinder, an annular piston mounted in said master cylinder and surrounding said central piston, means for displacing both of said pistons, and means comprising an annular packing cup surrounding said central piston and cooperating with said annular piston for preventing rearward movement of fluid during brake application but allowing substantially free forward movement thereof said annular packing cup being positioned in front of the annular piston and surrounding the small piston, thus allowing the liquid in front of the annular piston to be expelled through the outlet of the master cylinder.

8. For use in a hydraulic braking system, a master cylinder, a central piston mounted in said master cylinder, an annular piston mounted in said master cylinder and surrounding said central piston, a forward fixed head through which said central piston slides, means comprising an annular packing cup facing forward and positioned in front of the annular piston and surrounding the small piston at the forward fixed head for preventing rearward movement of fluid while allowing substantially free forward movement thereof, and means for displacing said pistons forward in said cylinder.

9. For use in a hydraulic braking system, a master cylinder, a central piston mounted in said master cylinder, an annular piston mounted in said master cylinder and surrounding said central piston, a forward fixed head through which said central piston slides, means comprising an annular packing cup associated with said head and facing forward for preventing rearward passage of fluid past said head during brake application while allowing substantially free forward passage of fluid, said cup being positioned in front of the annular piston and surrounding the central piston at the forward fixed head, thus allowing the liquid in front of the annular piston to be expelled through the outlet of the master cylinder, means for displacing one of said pistons, and means associated with said piston for bearing upon and displacing the other said piston.

10. In a hydraulic brake system, a cylinder, a central piston in said cylinder, an annular piston surrounding said central piston, a fixed annular head through which said central piston slides, a check valve comprising an annular cup packing positioned in front of said annular head and surrounding said central piston at the fixed annular head, thus allowing the liquid in front of the annular piston to be expelled to the outlet of the master cylinder, and a spring bearing at one end upon said annular piston and at the other end upon said central piston.

11. For use in a hydraulic brake system, a master cylinder, a central piston mounted in said master cylinder, an annular piston mounted in said master cylinder separate from and movable relative to said central piston and surrounding said central piston, manual means for displacing said central piston, a one-way annular check valve surrounding said central piston for preventing pressure produced by said central piston from reacting on the annular piston, and means dependent upon the operation of said central piston and comprising a resilient device for forming the sole connection between said pistons and for displacing said annular piston, said check valve allowing passage of fluid acted on by said annular piston in a forward direction but preventing passage rearwardly of fluid acted on by said central piston.

EUGENE G. CARROLL.